Figure 1:
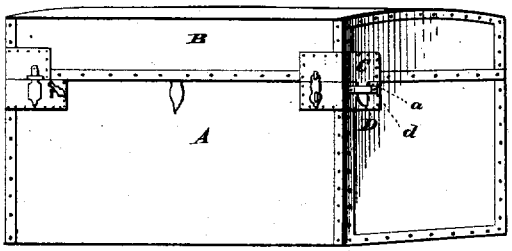

E. SEMPLE.

Assignor to J. J. COWELL.

Trunk.

No. 8,521. Reissued Dec. 10, 1878.

Witnesses,

J. H. Chumney

Fred C. Earle

Edw^d Semple,

Inventor.

By Atty.

Wm E. Earle

N. PETERS, PHOTO-LITHOGRAPHER, WASHINGTON, D. C.

UNITED STATES PATENT OFFICE.

EDWARD SEMPLE, OF CHICAGO, ILLINOIS, ASSIGNOR TO JOHN J. COWELL, OF NEWARK, NEW JERSEY.

IMPROVEMENT IN TRUNKS.

Specification forming part of Letters Patent No. 74,723, dated February 18, 1868; Reissue No. 8,521, dated December 10, 1878; application filed November 18, 1878.

*To all whom it may concern:*

Be it known that I, EDWARD SEMPLE, of Chicago, in the county of Cook and State of Illinois, have invented a new Improvement in Trunks; and I do hereby declare the following, when taken in connection with the accompanying drawing and the letters of reference marked thereon, to be a full, clear, and exact description of the same, and which said drawing constitutes part of this specification, and represents a perspective view.

This invention relates to a device to be applied to the body and cover of a trunk, preventing lateral motion of the cover, and to aid in securing the same; and it consists in the devices hereinafter described, and more particularly recited in the claims.

The general construction of the trunk does not differ essentially from well-known constructions, A representing the body, and B the cover, provided with the usual hinges and trunk-lock. The securing devices are in form of angle-plates at each corner—one, C, upon the cover, the other, D, on the body. One of the plates (here represented as C) is constructed with a projection or tongue, *a*, in substantially the same plane, or parallel with the vertical plane of the plate of which it forms a part. On the other plate is a loop or socket, *d*, into which the said projection *a* passes when the cover is closed, and when so closed the cover is prevented from any lateral motion.

One of the plates is provided with a hasp, hook, or any other suitable device, to engage with a locking device on the other plate, thus forming securing devices, combined with the supports between said plates, and independent of the principal lock of the trunk. By the use of these devices the connection between the body and the cover is made complete, and lateral motion or strain between the cover and the body is avoided, and the whole trunk made stronger and more durable.

I claim—

1. In a trunk-cover, a device independent of the trunk-lock, consisting of a plate constructed with a projection substantially parallel with the vertical plane of the plate, combined with a second plate, constructed with a socket to receive said projection, and the said two parts constructed to be applied, one plate to the cover and the other to the body of the trunk, substantially as described.

2. In a trunk-cover, a device independent of the trunk-lock, consisting of a plate constructed with a projection substantially parallel with the vertical plane of the plate, a second plate constructed with a socket to receive said projection, and the said two parts constructed to be applied, one plate to the cover and the other to the body of the trunk, and provided with a locking device to secure said two parts together in their closed condition, substantially as described.

EDWARD SEMPLE.

Witnesses:
C. R. MATSON,
JNO. C. COONLEY.